G. L. ROBERTSON.
TROLLEY.
APPLICATION FILED MAR. 19, 1913.
1,082,046.
Patented Dec. 23, 1913.
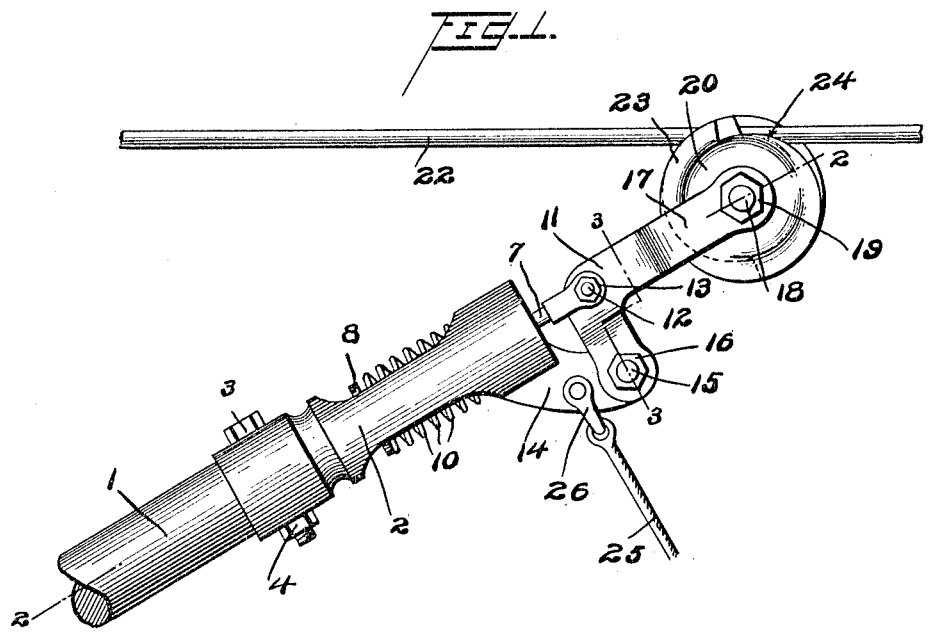
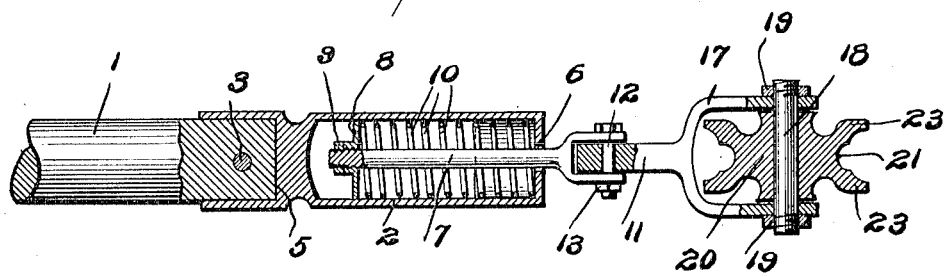
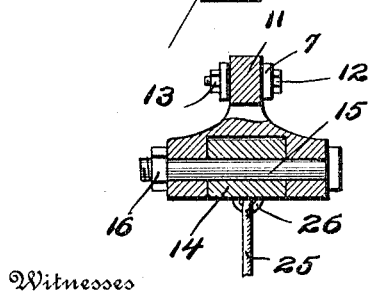
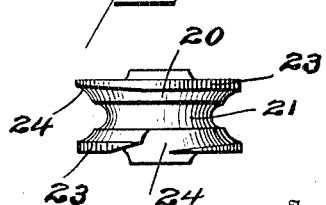
Witnesses
H. Strauss
C. R. Ziegler
Inventor
George L. Robertson
By Joshua R. H. Potts
Attorney

UNITED STATES PATENT OFFICE.

GEORGE LAWSON ROBERTSON, OF PHILADELPHIA, PENNSYLVANIA, ASSIGNOR, BY DIRECT AND MESNE ASSIGNMENTS, OF ONE-FOURTH TO LOUIS H. SCHWARTZ AND ONE-FOURTH TO T. KESLER SCHWARTZ, BOTH OF PHILADELPHIA, PENNSYLVANIA.

TROLLEY.

1,082,046.   Specification of Letters Patent.   Patented Dec. 23, 1913.

Application filed March 19, 1913. Serial No. 755,312.

*To all whom it may concern:*

Be it known that I, GEORGE L. ROBERTSON, a citizen of the United States, residing at Philadelphia, in the county of Philadelphia and State of Pennsylvania, have invented certain new and useful Improvements in Trolleys, of which the following is a specification.

My invention relates to improvements in trolleys, the object of the invention being to provide a trolley which will maintain the wheel in engagement with the wire under all conditions.

A further object is to provide an improved construction of trolley wheel having an improved mounting on the end of a trolley pole, whereby shocks, jolts, and vibrations are taken up by the wheel support at the end of the pole and not transmitted through the length of the pole.

A further object is to provide an improved construction of trolley wheel having a central annular wire receiving groove, and screw flanges or angularly grooved flanges at opposite sides thereof and out of alinement with each other, whereby the trolley wheel is prevented from accidentally following branch wires.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a view in section on the line 2—2 of Fig. 1. Fig. 3 is a view in section on the line 3—3 of Fig. 1, and Fig. 4 is a plan view of the trolley wheel.

1 represents a trolley pole upon the outer end of which a tubular frame 2 is secured by means of a bolt 3 and nut 4. This frame 2 has a socket 5 to snugly fit the end of pole 1 and when secured by the bolt 3 and nut 4, the frame will be rigidly held on the end of the pole.

The outer end of the tubular frame 2 is provided with an opening 6 through which a rod 7 projects. The inner end of this rod is screwed through a spring seat 8 securely held in place by a jam nut 9, and said spring seat bears against the inner end of a coiled spring 10 housed within the tubular frame 2, the latter being preferably cut out at opposite sides as clearly shown.

The outer end of rod 7 is bifurcated and is secured to an angle bracket 11. This angle bracket is of approximate L-shape in side elevation and the bifurcated end of rod 7 is secured to the bracket at the angle thereof by means of a bolt 12 and nut 13. The shorter end of this angle bracket 11 is enlarged transversely and bifurcated as seen most clearly in Fig. 3 to receive the free end of a curved arm 14 on frame 2. This arm 14 and the bifurcated end of bracket 11 are provided with registering openings for the reception of a bolt 15 secured in place by means of a nut 16. This transversely enlarged bracket prevents lateral movement and strengthens the device against torsional twisting strain. The long end of angle bracket 11 is forked as shown at 17 and in the forked end of the bracket, a journal bolt 18 is located and is secured in place by nuts 19 and providing rotary mounting for my improved trolley wheel 20. This trolley wheel 20 has a central annular groove 21 adapted to receive the trolley wire 22. The annular flanges 23 at both sides of the central groove 21 are formed with grooves 24 which cut the flanges at an angle, and the grooves 24 above referred to are located at opposite sides of the wheel, so that they are out of alinement. These flanges 23 with their grooves 24 constitute what I term "screw flanges" because the grooves therein have an angular relationship to the axis of the trolley wheel.

The operation is as follows: As the trolley wheel 20 moves along the trolley wire 22, shocks and vibrations imparted to the trolley wheel will be taken up by a spring 10 and the pole 1 will receive no appreciable movement, hence the trolley will be elastically held in contact with the trolley wire and prevented from jumping from the wire under conditions which frequently occur. Furthermore, the trolley wheel will maintain itself in engagement with the wire regardless of branch wires. When a juncture of branch wire is encountered, the branch wire engages the screw flange 23 riding in the groove 24 until a point is reached where a branch wire freely disengages itself from the trolley wheel, because the opposite flange of the trolley wheel has no such groove and the branch wire is deflected from between the flanges of the trolley wheel.

By means of the spring seat 8 and jam nut 9, the tension of spring 7 may be varied to exactly suit conditions, and while my invention is not limited to any particular manner of manipulating the pole, I have illustrated an ordinary flexible device 25 which is connected to a clevis 26 pivotally secured to arm 14 of frame 2.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a frame adapted to be secured on the end of a trolley pole, an angle lever pivotally connected at one end to the frame, a trolley wheel having rotary mounting in the other end of said angle lever, a rod pivotally connected to the angle lever and extending into the frame, a spring in the frame, said rod normally in substantial alinement with the wheel carrying member of the lever, and a spring seat secured on the rod and bearing at one end against the spring, substantially as described.

2. The combination with a tubular frame adapted to be secured on the end of a trolley pole, an arm on said frame at its outer end, an angle lever pivotally connected at one end to the arm, a trolley wheel supported at the other end of said angle lever, a rod pivotally connected to the lever at its angle and projecting into the frame, a coiled spring in the frame through which said rod projects, and a spring seat secured on said rod and bearing against the inner end of said spring, substantially as described.

3. The combination with a tubular frame adapted to be secured on the end of a trolley pole, an arm on said frame at its outer end, an angle lever pivotally connected at one end to the arm, a trolley wheel supported at the other end of said angle lever, a rod pivotally connected to the lever at its angle and projecting into the frame, a coiled spring in the frame through which said rod projects, a spring seat secured on said rod and bearing against the inner end of said spring, said angle lever at its point of juncture with said arm enlarged transversely and bifurcated receiving the end of said arm, and a bolt projected through alined openings in the arm and in the bifurcated end of the lever, substantially as described.

4. The combination with a tubular frame adapted to be secured on the end of a trolley pole, an integral arm on said frame, an angle bracket pivotally connected at one end to said arm, a rod pivotally connected to the angle of said bracket and projecting into the tubular frame, a spring in said tubular frame around the rod, a spring seat secured on the rod against the inner end of the spring, said bracket bifurcated at its free end, a journal bolt secured in said bifurcated end of the bracket, and a trolley wheel on said journal bolt, substantially as described.

In testimony whereof I have signed my name to this specification in the presence of two subscribing witnesses.

GEORGE LAWSON ROBERTSON.

Witnesses:
S. W. FOSTER,
CHAS. E. POTTS.

---

Copies of this patent may be obtained for five cents each, by addressing the "Commissioner of Patents, Washington, D. C."